United States Patent
Kang et al.

(10) Patent No.: US 12,455,154 B2
(45) Date of Patent: Oct. 28, 2025

(54) TAPE MEASURE HAVING INSTALLABLE BOBBIN

(71) Applicant: KOMELON CORPORATION, Busan (KR)

(72) Inventors: Dong Hun Kang, Busan (KR); Seok Jun An, Busan (KR)

( * ) Notice: Subject to any disclaimer, the term of this patent is extended or adjusted under 35 U.S.C. 154(b) by 382 days.

(21) Appl. No.: 18/032,769

(22) PCT Filed: Sep. 23, 2021

(86) PCT No.: PCT/IB2021/058683
§ 371 (c)(1),
(2) Date: Apr. 19, 2023

(87) PCT Pub. No.: WO2022/084769
PCT Pub. Date: Apr. 28, 2022

(65) Prior Publication Data
US 2023/0392915 A1 Dec. 7, 2023

(30) Foreign Application Priority Data

Oct. 21, 2020 (KR) .................. 10-2020-0136482

(51) Int. Cl.
*G01B 3/10* (2020.01)
*G01B 3/1005* (2020.01)
*G01B 3/1043* (2020.01)

(52) U.S. Cl.
CPC ......... *G01B 3/1005* (2013.01); *G01B 3/1043* (2020.01); *G01B 2003/103* (2013.01)

(58) Field of Classification Search
CPC .................. G01B 3/1005; G01B 3/1043
(Continued)

(56) References Cited

U.S. PATENT DOCUMENTS 4,527,334 A * 7/1985 Jones ............... G01B 3/1005
242/381.3
4,756,087 A * 7/1988 Sing ................. G01B 3/1005
D10/70
(Continued)

FOREIGN PATENT DOCUMENTS

JP H06-180201 A 6/1994

*Primary Examiner* — George B Bennett
(74) *Attorney, Agent, or Firm* — KORUS Patent, LLC; Seong Il Jeong

(57) ABSTRACT

Disclosed is a tape measure which includes a first housing module including a first housing providing a spring space on one side, a rotational shaft mounted rotatably on the first housing, a spring located in the spring space, the spring coupled to the first housing by one end and coupled to the rotational shaft by the other end, and a first cover covering the spring space, an installable bobbin rotatably mounted around the rotational shaft while being in close contact with the rotational shaft or the first cover of the first housing module is wound, and a second housing module including a second housing assembled with the first housing and a power transmission part for transmitting the rotation of the rotational shaft to the bobbin, wherein the first housing, the spring, the rotational shaft, the power transmission part, and the bobbin are mechanically connected when the bobbin is installed onto the first housing module and the second hosing module is assembled to the first housing module.

10 Claims, 9 Drawing Sheets

(58) Field of Classification Search
USPC .......................................... 33/755, 760, 761
See application file for complete search history.

(56) References Cited

U.S. PATENT DOCUMENTS

| | | | | |
|---|---|---|---|---|
| 5,791,581 A * | 8/1998 | Loeffler | ................. | B65H 75/44 |
| | | | | 242/380 |
| 6,226,886 B1 * | 5/2001 | Lamond | ................... | G01B 1/00 |
| | | | | 33/769 |
| 6,766,588 B1 * | 7/2004 | Hsu | ....................... | G01B 3/1005 |
| | | | | 242/375 |
| 6,892,469 B2 * | 5/2005 | Tufts | .................... | G01B 3/1084 |
| | | | | 33/761 |
| 6,964,114 B1 * | 11/2005 | Chen | .................... | G01B 3/1005 |
| | | | | 242/376 |
| 7,377,050 B2 * | 5/2008 | Shute | .................... | G01B 3/1041 |
| | | | | 33/761 |
| 7,458,537 B2 * | 12/2008 | Critelli | ................. | G01B 3/1005 |
| | | | | 242/376 |
| 8,215,027 B2 * | 7/2012 | Kang | ................... | G01B 3/1005 |
| | | | | 33/767 |
| 8,567,085 B2 * | 10/2013 | Roeske | ................ | G01B 3/1041 |
| | | | | 33/769 |
| 8,782,917 B2 * | 7/2014 | Hunsberger | ......... | G01B 3/1005 |
| | | | | 33/767 |
| 9,207,058 B2 * | 12/2015 | Delneo | ................ | B65H 75/486 |
| 9,874,428 B1 * | 1/2018 | Nelson | ................ | G01B 3/1005 |
| 10,422,616 B2 * | 9/2019 | Orsini | ................... | G01B 3/1005 |
| 10,836,603 B2 * | 11/2020 | Vitas | .................... | G01B 3/1041 |
| 11,391,555 B2 * | 7/2022 | Kang | ................... | G01B 3/1043 |
| 11,460,283 B1 * | 10/2022 | Panosian | ............ | G01B 3/1005 |
| 11,592,275 B2 * | 2/2023 | Shipley | ............... | G01B 3/1003 |
| 11,846,504 B2 * | 12/2023 | Nelson | ................ | G01B 3/1005 |
| 12,017,885 B2 * | 6/2024 | Vitas | ........................ | G01B 3/10 |
| 12,259,235 B2 * | 3/2025 | Zhou | ................... | G01B 3/1007 |
| 2010/0299948 A1 * | 12/2010 | Choi | .................... | G01B 3/1005 |
| | | | | 33/768 |
| 2020/0033108 A1 | 1/2020 | Vitas | | |
| 2024/0418492 A1 * | 12/2024 | Shih | ................... | G01B 3/1003 |
| 2025/0155231 A1 * | 5/2025 | Luo | ..................... | G01B 3/1061 |

* cited by examiner

TAPE MEASURE HAVING INSTALLABLE BOBBIN

TECHNICAL FIELD

The present invention relates to a tape measure, and more particularly, to a tape measure in which a user or worker can easily attach a bobbin and a blade.

BACKGROUND ART

A typical tape measure includes a housing, a reel elastically supported within the housing, a blade wound in a coil around the reel, and an end hook attached to the end of the blade. To take a measurement, the user pulls the blade out from the end hook and can measure the desired length or distance by extending the blade to the desired length.

Additionally, the elastic reel operates using a leaf spring and a bobbin to wind the blade around the outer surface of the bobbin. The blade is provided in a wound state around the bobbin and is pulled out from the housing, and then the blade can be returned to the bobbin in the winding direction by the restoring force of the leaf spring.

U.S. Pat. No. 6,751,883 entitled "REEL ROTATION MOUNT ARRANGEMENT EQUIPPED WITH FRICTION REDUCTION MEANS FOR TAPE MEASURE" discloses a reel mounting arrangement. According to the content of the reel attachment, the blade and spring are accommodated within a single reel, and one end of the spring is fixed to the shaft while the other end is fixed to the reel or blade. Therefore, for initial attachment, the spring must be wound up as much as possible, and once the reel is attached, it is very difficult to separate.

U.S. Patent Publication No. 2011/0099828 entitled "COMPACT TAPE MEASURE" discloses a compact tape measure, in which the one end of the return spring is fixed to the shaft and the other end is fixed to the spool, making it very difficult to separate the spool from the spring once it is initially attached. Of course, even in the manufacturing process, it is not easy to wind the spring and fix the spool inside the housing.

DISCLOSURE

Technical Problem

The present invention relates to a tape measure that facilitates the attachment and replacement of a reel, spool, or bobbin for winding the blade. The tape measure is designed to make the attachment process easy and, if necessary, also facilitate replacement.

The present invention relates to a tape measure that allows the bobbin to be attached, separated, or replaced independently of the spring, without directly connecting the spring and the bobbin.

Technical Solution

As an exemplary embodiment of the present invention for achieving the above-described objectives, a tape measure including an installable bobbin for winding the blade is provided. The tape measure includes a first housing module, an installable bobbin, and a second housing module. The first housing module includes a first housing providing a spring space on one side, a rotational shaft mounted rotatably on the first housing, a spring coupled to the first housing by one end within the spring space and coupled to the rotational shaft by the other end, and a first cover covering the spring space. The second housing module includes a second housing corresponding to the first housing and a power transmission part for transmitting the rotation of the rotational shaft to the bobbin. The bobbin is mounted around the rotational shaft while being in close contact with the rotational shaft or the first cover of the first housing module. When the bobbin is mounted onto the first housing module and the second housing module is assembled with the first housing module, the first housing, the spring, the rotational shaft, the power transmission part and the bobbin can be mechanically connected.

The first cover may further include a protruding cylindrical extension to accommodate the outer surface of the rotational shaft. In this case, when the outer surface of the rotational shaft or the extension comes into contact with the inner surface of the bobbin, it can facilitate the installation of the bobbin and stably support the rotation of the bobbin.

By mounting the bobbin in close contact with the outer surface of the rotational shaft, the space within the bobbin can be utilized more efficiently. For example, by eliminating the space between the bobbin and the axis, blades of various lengths can be wound on the bobbin, and the length of the blade can be increased without increasing the overall size of the housing.

Furthermore, by using a combination of blades and bobbins of various lengths such as 25 ft, 35 ft, 45 ft, 50 ft, etc., it is possible to implement a tape measure of various lengths without the need to separate the housing, rotational shaft, spring, etc., as long as the coupling structure between the bobbin and the power transmission part is maintained. Also, because the installation and replacement are easy, it not only enhances work efficiency but also allows even general users to easily replace the bobbin and blade.

The power transmission part of the second housing module can mechanically connect the free end of the rotational shaft and the bobbin using gears or a gear train. For example, the power transmission part may be installed on the inner side of the second housing and may include a first gear engaged with the end of the rotational shaft, a second gear engaged with the first gear, and a third gear that transmits rotation to the bobbin by engaging with the second gear.

The second housing module may further include a second cover that covers the gear space in which the first gear and second gear are installed.

The third gear can also be installed in the gear space or integrated with the bobbin. For example, if the third gear is integrated with the bobbin, when the second housing module is coupled to the first housing module, the third gear can engage with the second gear through the second cover. And if the third gear is separated and installed in the gear space, when the second housing module is coupled to the first housing module, the third gear can be coupled with the bobbin.

The first housing can be connected to the outer or inner side of the spring. In the case of connection from the inner side of the spring, the rotational shaft can include a flange that rotates along the outer periphery of the spring space, where the outer end located on the outer side of the spring is connected to the flange, and the other end located on the inner side of the spring can be connected to the first housing at the central part of the spring space.

If the rotational shaft including the flange is connected to the spring at its outside, it can be assembled more easily by using a fixing protrusion. For example, the fixing protrusion can be directly fixed to the end located on the inside of the spring, and can be positioned at a center of the rotational shaft to let the rotational shaft and the flange rotate. Therefore, the fixing protrusion is partially inserted into the rotational shaft, and the inner end of the spring is fixed to the first housing via the fixing protrusion, and the outer end of the spring is fixed to the rotational shaft via the flange.

As an exemplary embodiment of the present invention for achieving the above-mentioned objectives, a tape measure including an installable bobbin comprises a first housing module, an installable bobbin, and a second housing module. The first housing module includes a first housing that provides a spring space on one side, a rotational shaft that is pivotally mounted to the first housing on one end and has a first end of the spring attached to the first housing in the spring space and a second end of the spring attached to the rotational shaft, and a first cover that covers the spring space. The second housing module includes a second housing corresponding to the first housing, and the bobbin can be detachably mounted around the rotational shaft or on the first cover of the first housing module. The bobbin is directly coupled to a free end of the rotational shaft when attached to the first housing module, and the first housing, spring, rotational shaft, and bobbin can be mechanically connected when the second housing module is assembled with the first housing module.

Unlike the previous example, in which power transmission was achieved through a gear or gear train, the bobbin can be directly connected to the free end of the rotating shaft when it is attached to the rotating shaft or the first cover without using a power transmission part. In this case, the free end of the rotating shaft can be shaped as a polygonal pillar such as a square or triangle, and a corresponding groove can be formed in the bobbin to physically connect the bobbin and the free end of the rotating shaft.

The first cover may further include a cylindrical extension protruding to accommodate the outer surface of the rotational shaft, and the inner surface of the bobbin may be provided in a shape that can contact the outer surface of the rotational shaft or the extension.

Advantageous Effects

The tape measure of the present invention is provided as modular components, such as the first housing module and the second housing module, and the mounting of the bobbin for winding the blade can be easily done by assembling the housing modules, making it easy to install and replace.

In the conventional tape measure, the restoring force of the spring was transmitted in the order of the bobbin and the blade with the rotational shaft as the reference, but in the tape measure according to this embodiment, the restoring force of the spring can be transmitted in the order of the rotational shaft, power transmission part, bobbin, and blade with the housing as the reference.

Since the spring and the bobbin are indirectly connected without being directly connected, the bobbin and the blade can be mounted, detached, or replaced separately without disassembling the spring.

MODES OF THE INVENTION

Figure 1:
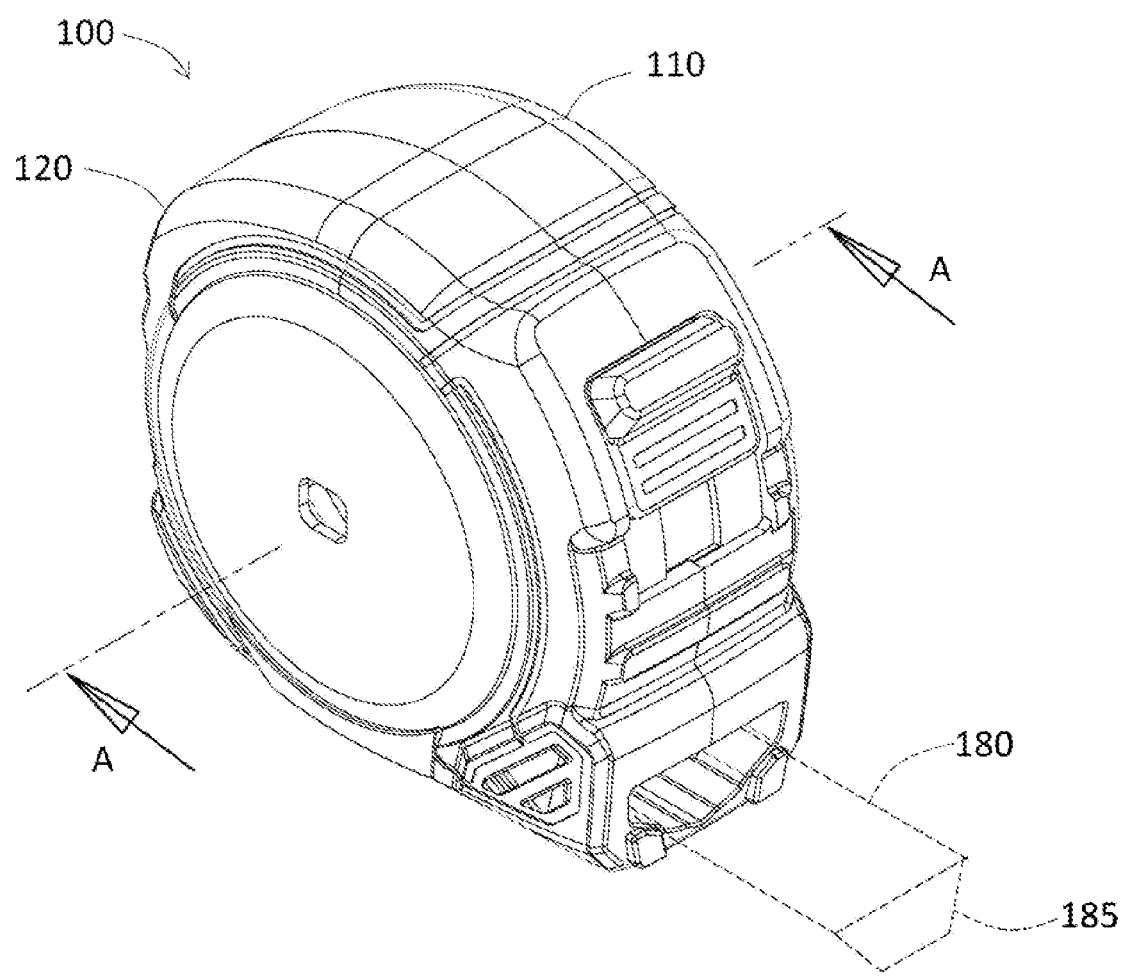
FIG. 1 is a perspective view of a tape measure according to one embodiment of the present invention.

Hereinafter, exemplary embodiments of the present invention will be described in detail with reference to the accompanying drawings, but the present invention is not limited or restricted to the exemplary embodiments. For reference, in the description, like reference numerals substantially refer to like elements, which may be described by citing contents disclosed in other drawings under such a rule and contents determined to be apparent to those skilled in the art or repeated may be omitted.

Figure 2:
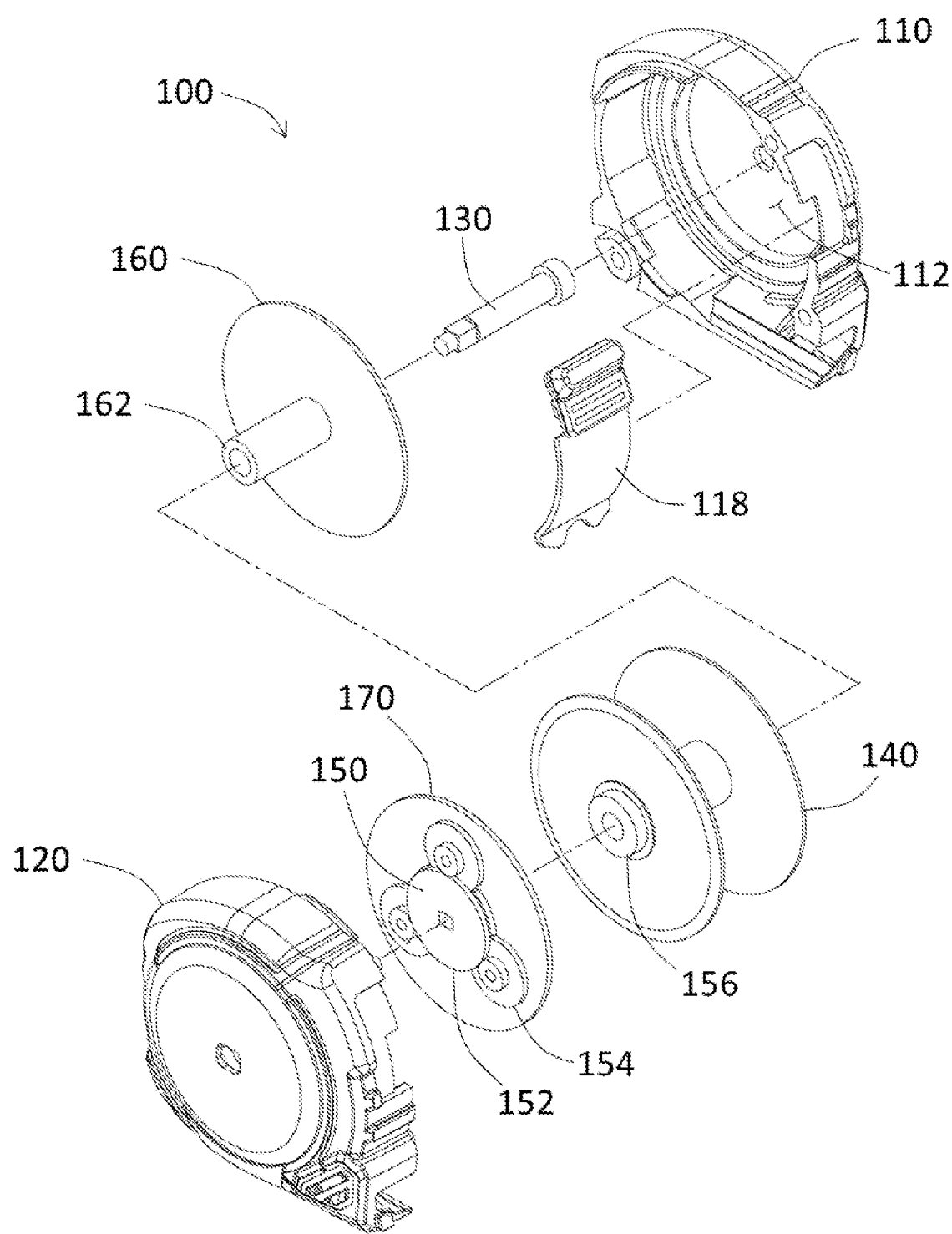
FIG. 2 is an exploded perspective view of the tape measure of FIG. 1.
Figure 3:
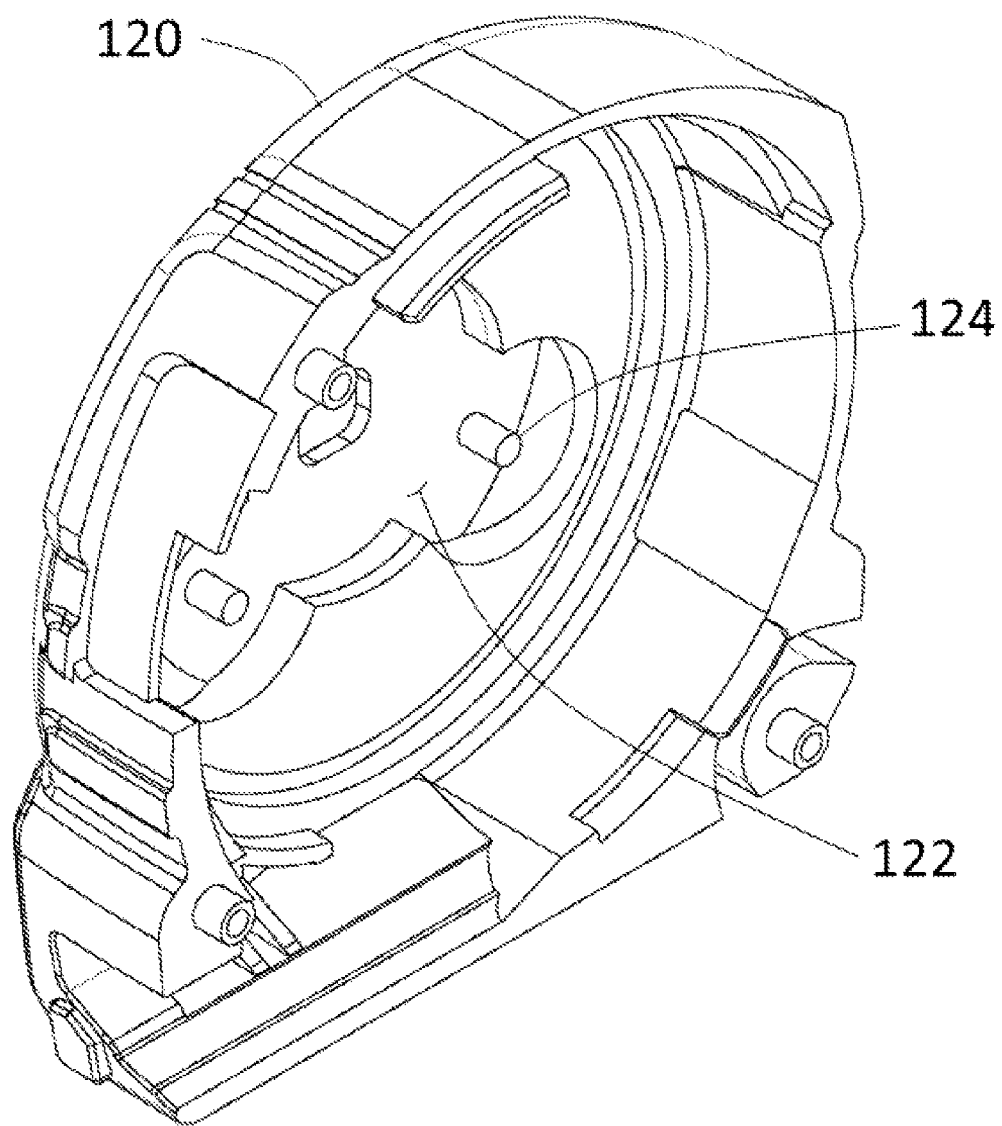
FIG. 3 is a sectional view illustrating the interior of the second housing of the tape measure of FIG. 1.
Figure 4:
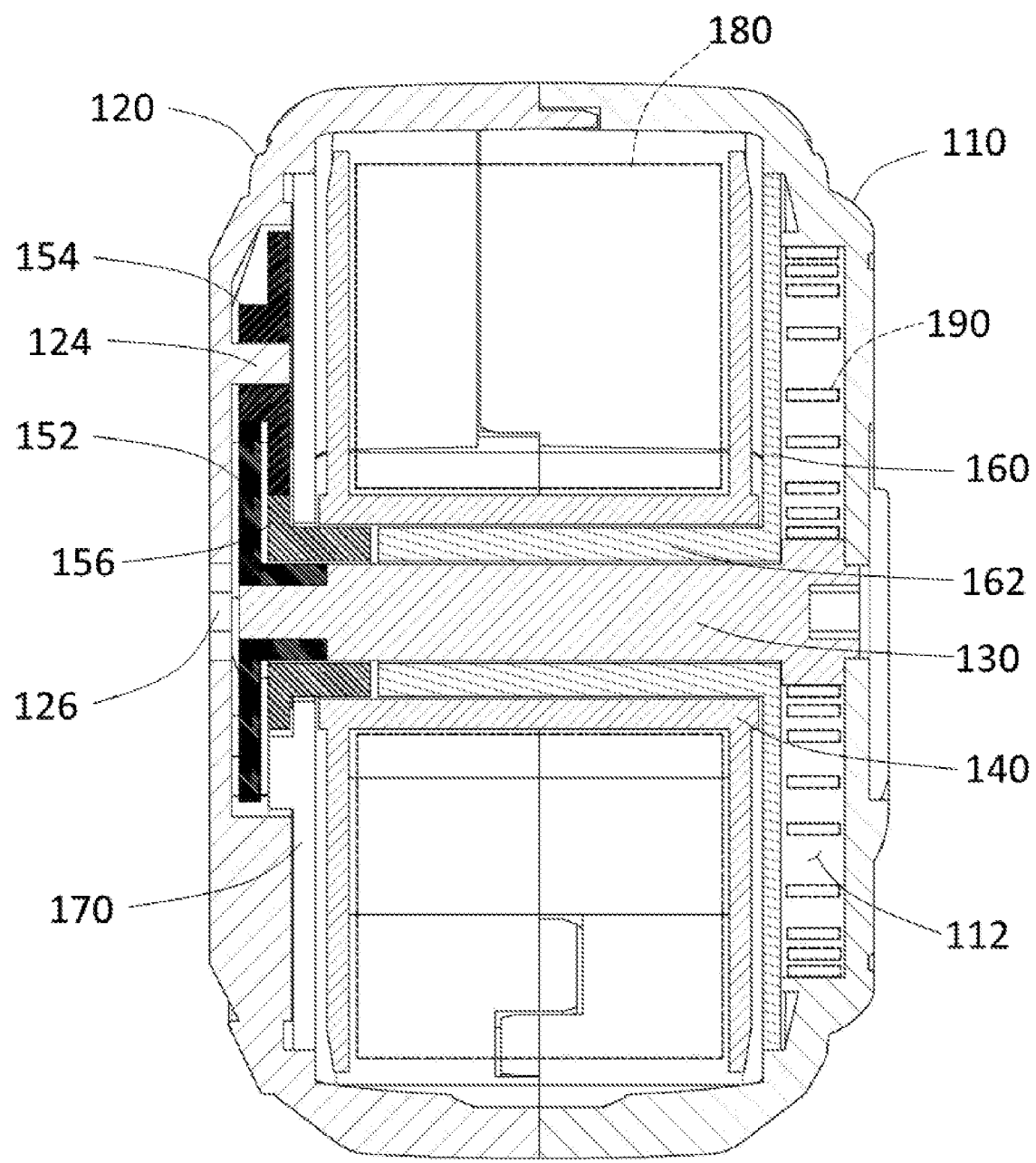
FIG. 4 is a sectional view taken along line A-A of FIG. 1.
Figure 5:
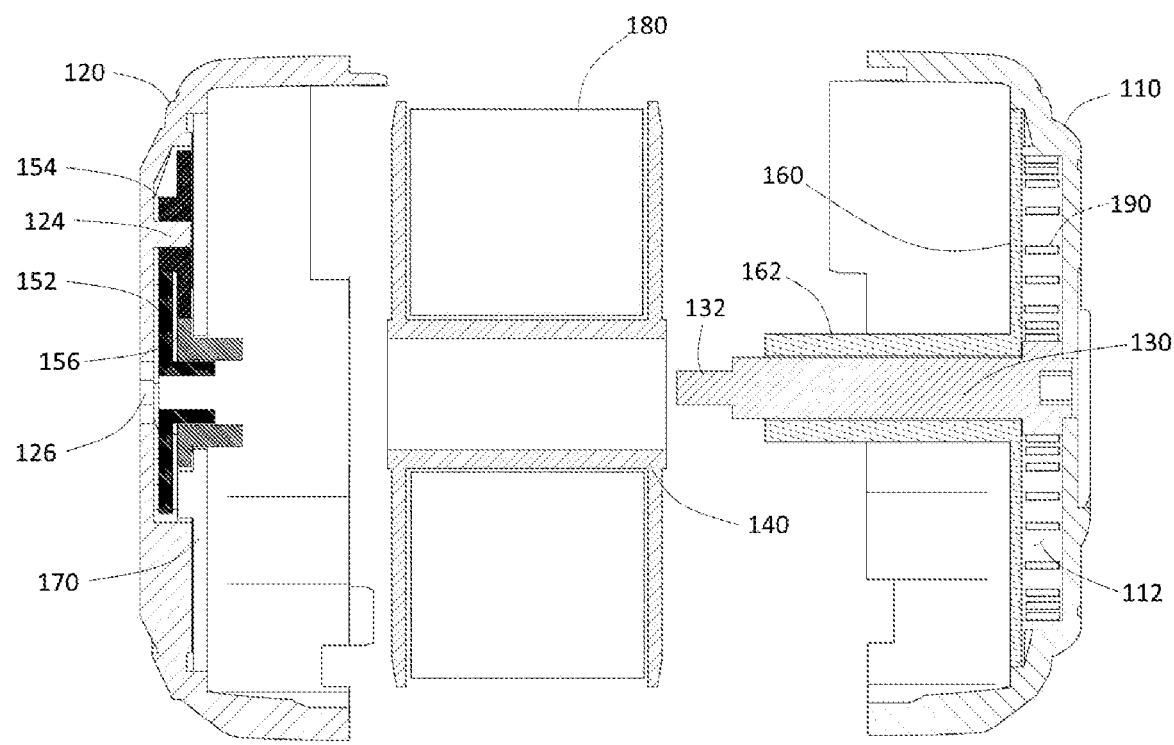
FIG. 5 is a sectional view illustrating the assembly process of the tape measure of FIG. 1, FIGS. 6a to 6c are sectional views illustrating the examples of varying the length of the blade using tape measures with structures similar to that of FIG. 1, FIGS. 7a and 7b are sectional views illustrating the structures of tape measures according to other embodiments of the present invention.

FIG. 1 is a perspective view of a tape measure according to one embodiment of the present invention, FIG. 2 is an exploded perspective view of the tape measure of FIG. 1, FIG. 3 is a sectional view illustrating the interior of the second housing of the tape measure of FIG. 1, FIG. 4 is a sectional view taken along line A-A of FIG. 1, and FIG. 5 is a sectional view illustrating the assembly process of the tape measure of FIG. 1.

Referring to FIGS. 1 to 5, the tape measure (100) according to this embodiment includes a removable, detachable, or replaceable bobbin (140), and by assembling the first housing module (I) and the second housing module (II) around the bobbin (140), the assembly of the tape measure can be completed. In other words, a desired length of blade (180) and the bobbin (140) can be installed in the first housing module (I), and then the second housing module (II) can be placed over the opposite side to assemble the tape measure, making assembly and maintenance easier than conventional tape measures.

The tape measure (100) comprises the first housing module (I), the bobbin (140), and the second housing module (II). The first housing module (I) includes a first housing (110) providing a spring space (112) therein, a rotating shaft (130) rotatably mounted to the first housing (110), a spring (190) that is secured to the first housing (110) in the spring space (112) by one end and to the rotating shaft (130) by the other end, and a first cover (160) covering the spring space (112). These components can be provided in a semi-assembled state.

The rotating shaft (130) or the first cover (160) forms a structure that protrudes in the first housing module (I), and the installable bobbin (140) on which the blade (180) is fully wound can be fitted onto the protruding rotating shaft (130) for assembly.

The second housing module (II) may include a second housing (120) corresponding to the first housing (110) and a power transmission part (150) that transmits the rotation of the rotating shaft (130) to the bobbin (140). When the second housing module (II) is assembled to the first housing module (I), it can cover the bobbin (140) and fix the other end of the rotating shaft (130) to be rotatable.

In the conventional tape measure, the restoring force of the spring was transmitted in the order of the bobbin and blade with respect to the rotational shaft. However, in the tape measure according to this embodiment, the restoring force of the spring can be transmitted in the order of the rotational shaft, the power transmission part, the bobbin, and the blade with respect to the housing.

In addition, in the conventional tape measure, if one of the two housings is separated, the spring can be fully released, and once the spring is released, it cannot be fully wound back by the force of an ordinary consumer.

In this embodiment, however, the assembly process can be completed simply by inserting the bobbin (140) onto the rotational shaft (130) when the blade is fully wound, and then assembling the second housing module (II) and further rotating the rotational shaft (130) by about 90 degrees to fix the second housing module (II). Conversely, even if the first housing module (I) and the second housing module (II) are separated, there is no concern about the spring (190) being released, as it is confined to the spring space (112), and there is no danger as it is in a maximally released state within the spring space (112).

In addition, since the spring (190) and the bobbin (140) are indirectly connected through the rotating axis (130) and the power transmission part (150) that enable the rotation of the bobbin, it is possible to separate or replace the bobbin (140) and blade from the tape measure without disassembling the spring (190).

In this embodiment, the spring (190) can be provided as a spiral spring and can be formed with a narrow width and thick thickness compared to the conventional spring. The spring (190) can continuously provide the force to wind the blade (180), and the blade (180) pulled out to the outside of the housing can return to the inside of the housing and wind around the center of the bobbin (140). Of course, the spring can be provided in different forms, and in some cases, an electronic motor can be used instead of the spring to replace or assist the restoring force.

Between the first housing (110) and the second housing (120), the rotating shaft (130), the first cover (160), the bobbin (140), the second cover (170), and the power transmission part (150) can be provided. In particular, in this embodiment, the rotating shaft (130) is not fixed to the first housing (110) and the second housing (120) and can rotate within the housing, and the outer end of the spring (190) accommodated in the spring space (112) is fixed to the first housing (110), and the inner end of the spring (190) can transmit the rotational force of the spring to the rotating shaft (130).

With the spring (190) and the rotating shaft (130) installed, the first cover (160) forming a cylindrical extension can be fixed to the inner side of the first housing (110). When the first cover (160) is attached to the first housing (110), a single sub-assembly consisting of the spring (190), the rotating shaft (130), and the first cover (160) connected as one unit can be provided, as shown on the right side of FIG. 5.

As shown in FIG. 3, a gear space (122) can be formed on the inside of the second housing (120), and the gear space (122) can accommodate the first gear (152) and the second gear (154). The three second gears (154) can be mounted on three protruding shafts (124) formed in the gear space (122) respectively, and the three second gears (154) can be engaged with the first gear (152) centered around it.

In this embodiment, a third gear (156) can be provided inside the inner side of the second gears (154), and the center of the third gear (156) can be provided with a hollow so that the connecting portion of the first gear (152) can be exposed. As shown on the left side of FIG. 5, another semi-assembled part can be provided, which includes the first gear (152), the second gear (154), the third gear (156), and the second cover (170) installed together as a single unit, in the second housing (120).

The blade (180) is wound on the bobbin (140), and the bobbin (140) can be inserted into the protruding portion of the rotational shaft (130) and the cylinder-shaped extension (162), and the second housing module (II) including the second housing (120) can be assembled to the first housing module (I). In this process, a stopper (118) or the like can be installed between the first housing (110) and the second housing (120).

During the process of assembling the first housing module (I) and the second housing module (II), the end coupling portion (132) of the rotational shaft (130) can be connected to the first gear (152), and the third gear (156) can also be connected to the inside of the bobbin (140). Therefore, the rotation of the rotational shaft (130) is transmitted to the first gear (152) through the end coupling portion (132), and the rotation of the first gear (152) is transmitted to the third gear (156) through the second gear (154), and the rotation of the third gear (156) can be transmitted to the bobbin (140). By designing a gear ratio, the rotation ratio between the spring (190) and the bobbin (140) can be appropriately adjusted.

FIGS. 6a to 6c are sectional views illustrating the examples of varying the length of the blade using tape measures with structures similar to that of FIG. 1.

Referring to FIGS. 6a to 6c, it is possible to install or replace blades and bobbins of various lengths while keeping the first housing (110), the second housing (120), the rotating shaft (130), the spring (190), the first cover, the second cover, and the gears the same.

As shown in FIG. 6a, when it is desired to increase the measurable length to about or 50 ft, for example, based on the bobbin (140) for the blade (180) of approximately 35 ft in length, the manufacturer or the user can also extend the measurable length by different sets for the blades (180-m, 180) and the bobbins (140-m, 140) that fit into the same structure, as shown in FIGS. 6b and 6c. In this process, the size of the housings (110, 120) can remain unchanged, and it may be possible to increase the blade area in the bobbin.

The manufacturer can create a variety of product lines by using the same structure and the same size of housing, but different blades and bobbins. Similarly, users can also replace blades and bobbins to use them as a brand-new product or to change them to different lengths if needed.

As shown in FIG. 5, when installing a bobbin (140) wound with blades (180), the manufacturer can complete the housing coupling by engaging the first gear (152) and the rotational shaft (130) through the central through-hole (126) of the second housing (120) after rotating the rotational shaft (130) by a small angle, such as about 90 degrees, in this state. This means that the process of turning the spring almost to its maximum tension before assembly can be omitted, allowing the maximum tension to be maintained without the conventional step.

The first cover (160) can have an overall T-shaped cross-section and can provide a hollow cylindrical extension (162) in the center to accommodate the rotational shaft (130). The cylindrical extension (162) can function as an inner shaft bearing for the rotational shaft (130) and as an outer shaft bearing for the bobbin (140). By using the cylindrical extension (162), direct contact between the rotational shaft (130) and the bobbin (140) can be prevented or reduced, making the wheeling of the bobbin (140) around the rotational shaft (130) smoother.

Figure 6:
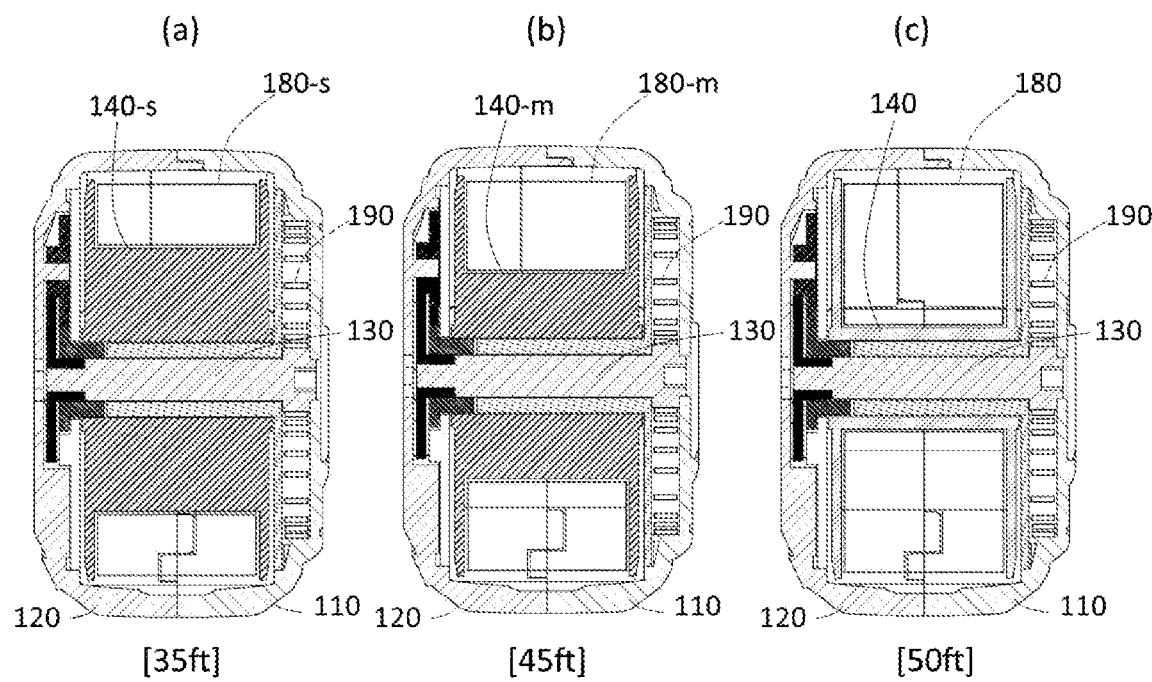

The power transmission part (150) of this embodiment can use a gear train consisting of the first gear (152), the second gear (154), and the third gear (156), and the gear train can be protected by the second cover (170) with a central through-hole. By using the power transmission part (150) with gears, the rotation speed of the rotational shaft (130) connected to the spring (190) can be kept relatively low compared to the rotation speed of the bobbin (140), and as shown in FIG. 6, as the measurable length of the blade (180) increases, the bobbin needs to secure sufficient rotational speed, so the gear train with a reduction ratio can be used.

Figure 7:
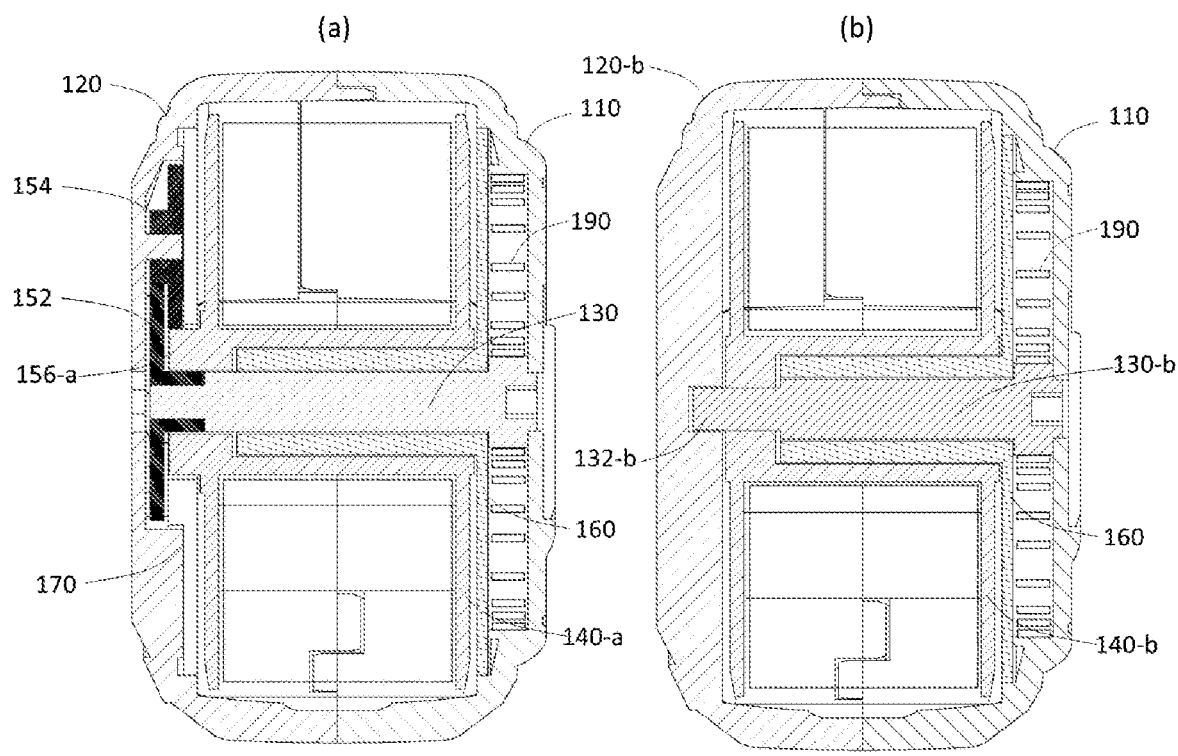
Figure 8:
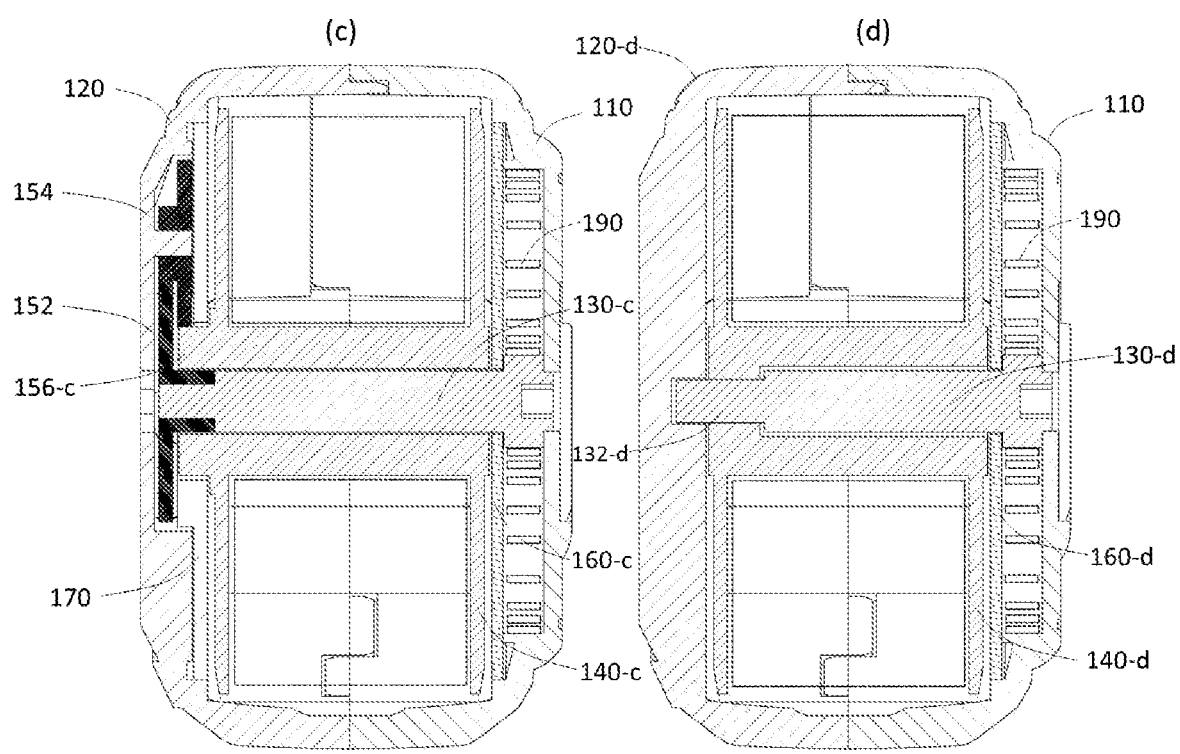
FIGS. 8c and 8d are sectional views illustrating the structures of tape measures according to other embodiments of the present invention.

FIGS. 7a and 7b are sectional views illustrating the structures of tape measures according to other embodiments of the present invention, and FIGS. 8c and 8d are sectional views illustrating the structures of tape measures according to other embodiments of the present invention.

As shown in FIG. 7a, it is also possible to form a third gear (156-a) integrally with a bobbin (140-a). The third gear (156-a) of the power transmission part can be formed integrally with the bobbin (140-a), and a space for the third gear (156-a) can be formed in the second cover (170) of the second housing (120). When the second housing (120) and the first housing (110) are coupled, the third gear (156-a) which is integrated with the bobbin (140-a) can pass through the second cover (170) and engage with the second gear (154), and once engaged, it can transmit the restoring force from the rotational shaft (130) to the bobbin (140).

As shown in FIG. 7b, the end connection part (132-b) of the rotating shaft (130-b) and the inner part of the bobbin (140-b) can be directly engaged without a power transmission part. In this case, a gear reduction ratio is 1, but the rotation of the rotating shaft (130-b) can be directly transmitted to the bobbin (140-b).

The end connection part (132-b) of the rotational shaft (130) can be provided in a polygonal shape such as a square column or a triangular column instead of a circular shape, and the part that is connected to the bobbin (140) can also have a groove or a hole corresponding to the polygonal shape, allowing the rotational shaft (130-b) to be physically connected to the bobbin (140) at the end.

As shown in FIG. 8c, the first cover (160-c) can be provided in a disk shape without a cylindrical extension. Even in this case, the rotational force can be transmitted to the bobbin (140-c) through the first gear (152), the second gear (154), and the third gear (156-c) connected to the rotational shaft (130-c).

As shown in FIG. 8d, a tape measure can be provided without a power transmission part or a cylindrical extension. The end connecting part (132-d) of the rotating shaft (130-d) and the inner part of the bobbin (140-d) can be directly connected. A portion where the end connecting part (132-d) is connected to the bobbin (140-d) can be provided in a polygonal prism shape, and A portion inserted into the second housing (120-d) can be provided in a cylindrical or conical shape. The first cover (160-d) can be provided in a disk shape without a cylindrical extension, and the second cover can be omitted together with the gear space.

Figure 9:
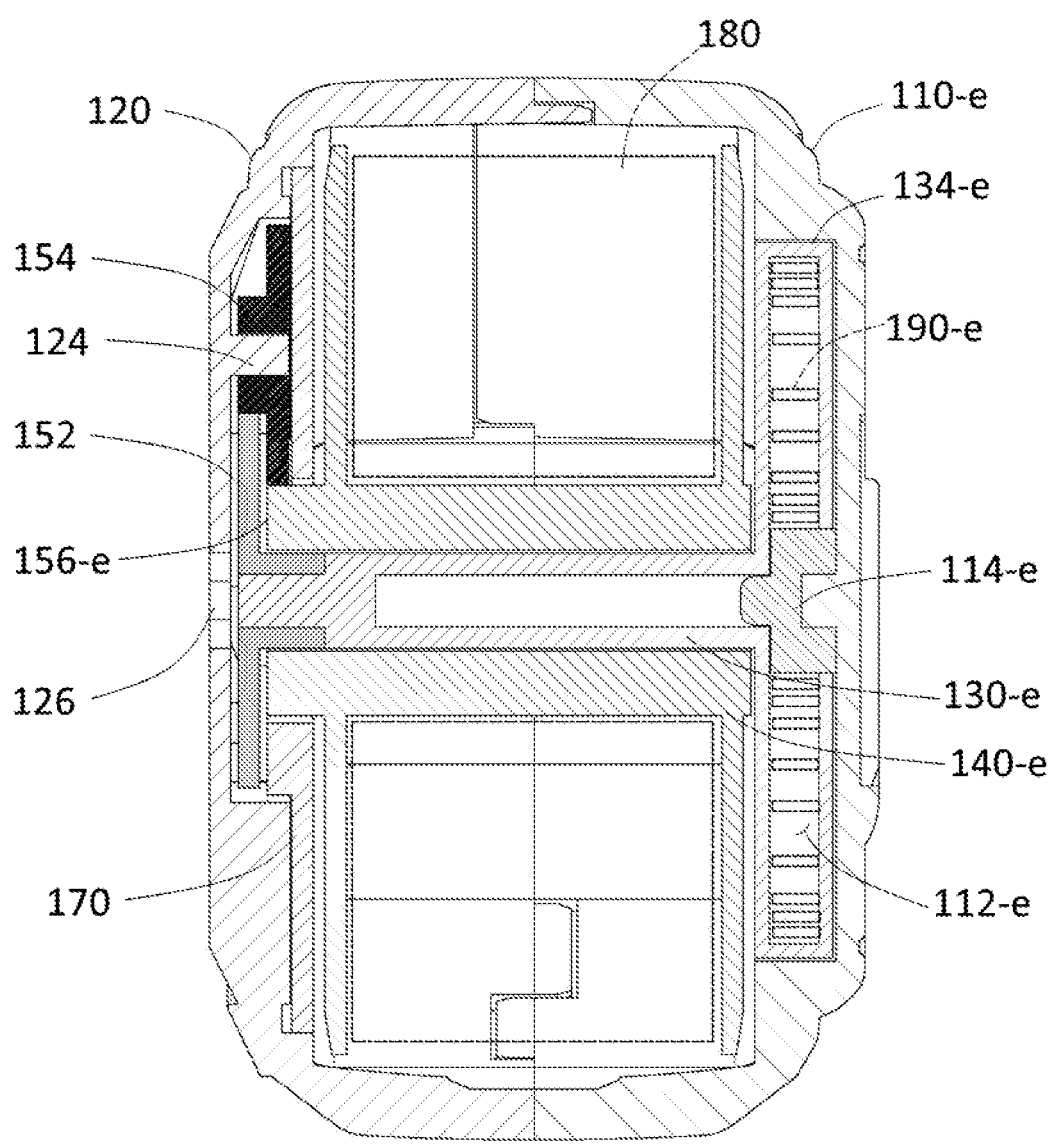
FIG. 9 is a sectional view illustrating the structure of a tape measure according to another embodiment of the present invention.

FIG. 9 is a sectional view illustrating the structure of a tape measure according to another embodiment of the present invention.

Referring to FIG. 9, a tape measure can be provided as a semi-assembled modules consisting of the first housing module (I) and the second housing module (II), and the bobbin (140-e) can be installed between the first housing module (I) and the second housing module (II).

The rotational shaft (130-e) of the first housing module (I) can be formed not only as a simple shaft structure but also as a structure including a flange (134-e). In this embodiment, the flange (134-e) is formed in the base of the rotational shaft (130) to accommodate the spring (190), and the outer part of the spring (190-e) is connected to the rotational shaft (130-e) by the flange (134-e), and the inner part of the spring (190-e) is fixed to the first housing (110-e).

The flange (134-e) can be formed integrally with the rotating shaft (130-e) and can rotate along the outer perimeter or edge of the spring space (112-e). The rotating shaft (130-e) can be mounted relative to the first housing (110-e) using a fixing protrusion (114-e).

The fixed protrusion (114-e) can include a non-circular groove for engagement with the first housing (110-e), which can include a corresponding protrusion. The fixing protrusion (114-e) can be engaged to the inner end of the spring (190-e), and the inner surface of the flange (134-e) can be connected to the outer end of the spring (190-e).

Thereby, the rotating shaft (130-e), the flange (134-e), the fixing protrusion (114-e), and the spring (190-e) can also be provided as a semi-assembled component, as if they were one part. The manufacturer can install the semi-assembled component including the rotating shaft (130-e) into the first housing (110-e), insert the blade (180) and the bobbin (140-e) on the shaft, and finally assemble the second housing (120) including the first gear (152) and the second gear (154) to complete the assembly of the tape measure.

The bobbin (140-e) and the third gear (156-e) can be provided as an integrated body, and the third gear (156-e) can be engaged with the second gear (154) when the second housing (120) is coupled.

As described above, the present invention has been described with reference to the preferred embodiments. However, it will be appreciated by those skilled in the art that various modifications and changes of the present invention can be made without departing from the spirit and the scope of the present invention which are defined in the appended claims and their equivalents.

The invention claimed is:

1. A tape measure including:
   a first housing module, the first housing module including a first housing providing a spring space on one side, a rotational shaft mounted rotatably on the first housing, a spring located in the spring space, the spring coupled to the first housing by one end and coupled to the rotational shaft by the other end, and a first cover covering the spring space;
   an installable bobbin rotatably mounted around the rotational shaft while being in close contact with the rotational shaft or the first cover of the first housing module, on which a blade is wound; and
   a second housing module, the second housing module including a second housing assembled with the first housing and a power transmission part for transmitting the rotation of the rotational shaft to the bobbin,
   wherein, as the bobbin is installed onto the first housing module and the second housing module is assembled to the first housing module, the first housing, the spring, the rotational shaft, the power transmission part, and the bobbin are mechanically connected.

2. The tape measure of claim 1, wherein the first cover further includes a cylindrical extension which protrudes from the first cover to accommodate the outer surface of the rotational shaft and the outer surface of the rotational shaft or the cylindrical extension comes into contact with the inner surface of the bobbin.

3. The tape measure of claim 1, wherein the power transmission part of the second housing module is in the second housing module and includes a first gear engaged with the rotational shaft, a second gear engaged with the first gear, and a third gear engaged with the second gear to make the bobbin rotate.

4. The tape measure of claim 3, wherein the second housing module further includes a second cover that covers the gear space in which the first gear and second gear are installed.

5. The tape measure of claim 4, wherein the third gear is integrated with the bobbin and passes through the second cover to engage with the second gear when the second housing module is coupled to the first housing module.

6. The tape measure of claim 4, wherein the third gear is installed in the gear space and engages with the bobbin when the second housing module is coupled to the first housing module.

7. The tape measure of claim 1, wherein the rotational shaft includes a flange that extends to outer periphery of the spring space, where the other end of the spring is connected to the flange, and the one end of the spring is connected to the first housing at a central part of the spring space.

8. The tape measure of claim 7, wherein the first housing includes a fixing protrusion which is located at a center of the first housing and fixed to the one end of the spring and the rotational shaft is mounted rotatably around the fixing protrusion.

9. A tape measure including:
a first housing module, the first housing module including a first housing providing a spring space on one side, a rotational shaft mounted rotatably on the first housing, a spring located in the spring space, the spring coupled to the first housing by one end and coupled to the rotational shaft by the other end, and a first cover covering the spring space;
an installable bobbin rotatably mounted around the rotational shaft while being in close contact with the rotational shaft or the first cover of the first housing module, on which a blade is wound; and
a second housing module, the second housing module including a second housing assembled with the first housing,
wherein, as the bobbin is installed onto the first housing module, the bobbin is directly coupled to a free end of the rotational shaft when accommodating the rotational shaft of the first housing module, and the first housing, the spring, the rotational shaft, and bobbin are mechanically connected when the second housing module is assembled with the first housing module.

10. The tape measure of claim 9, wherein the first cover further includes a cylindrical extension which protrudes from the first cover to accommodate the outer surface of the rotational shaft and the outer surface of the rotational shaft or the cylindrical extension comes into contact with the inner surface of the bobbin.

\* \* \* \* \*